United States Patent

[11] 3,549,166

[72] Inventors Thomas S. Moore
 Dearborn;
 James T. Ross, Dearborn Heights, Mich.
[21] Appl. No. 745,851
[22] Filed July 18, 1968
[45] Patented Dec. 22, 1970
[73] Assignee Ford Motor Company
 Dearborn, Mich.
 a corporation of Delaware

[54] VIBRATION DAMPER AND PRELOADER BEARING ASSEMBLY
 13 Claims, 3 Drawing Figs.
[52] U.S. Cl. .................................................. 280/96.1, 308/120
[51] Int. Cl. .................................................. B62d 7/18
[50] Field of Search ........................................... 280/96.1, 96.3; 180/43; 308/241, 120, 170, 184

[56] References Cited
 UNITED STATES PATENTS

| | | | |
|---|---|---|---|
| 3,146,979 | 9/1964 | Keetch | (308/184UX) |
| 3,178,907 | 4/1965 | Lyons | 308/184X |
| 3,255,839 | 6/1966 | Goldman | 180/43 |

Primary Examiner—Kenneth H. Betts
Attorney—John R. Faulkner and Clifford L. Sadler ABSTRACT: A bearing assembly that supports radial and thrust loads and which includes a preloaded elastomeric element providing torsional drag, shock absorption, and vibration damping.

PATENTED DEC 22 1970 3,549,166
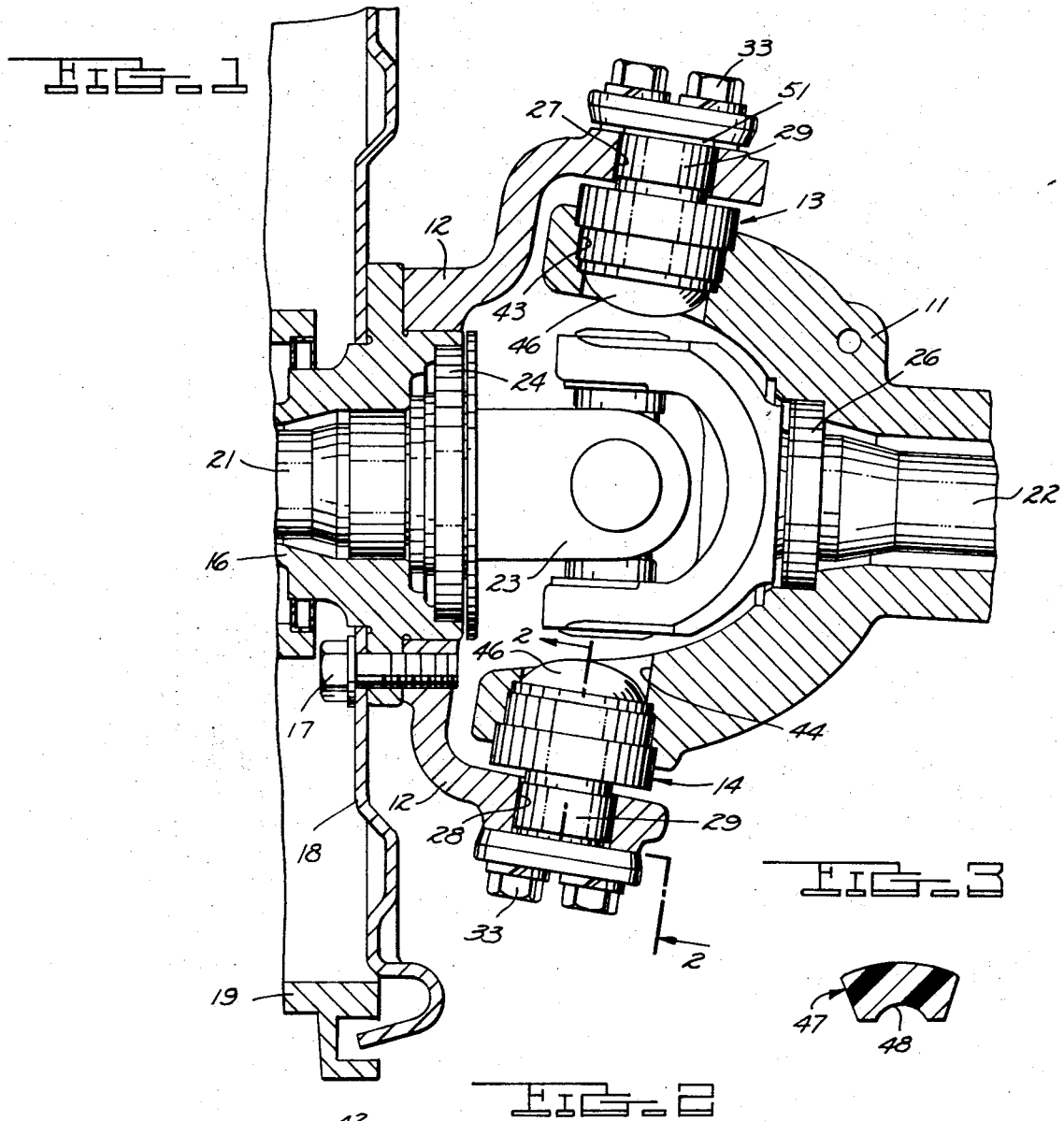
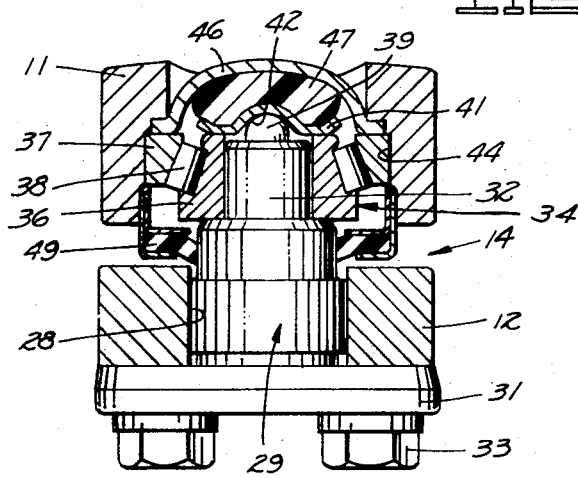
THOMAS S. MOORE
JAMES T. ROSS
INVENTORS
BY John R. Faulkner
Clifford L. Sadler
ATTORNEYS

VIBRATION DAMPER AND PRELOADER BEARING ASSEMBLY

BACKGROUND OF THE INVENTION

Antifriction bearings that support thrust and radial impact loads in addition to sustained loads experience continuously increasing rates of wear during service. In certain applications such wear causes undesirable vibrations, unsmooth operation, and eventually structural failure of the bearing assembly.

This invention provides a bearing assembly that supports both thrust and radial loads and which significantly reduces wear between bearing elements. The invention further provides a bearing assembly which is torsionally preloaded or has a torsional drag, absorbs impacts between the bearing elements, and dampens vibrations transmitted to it. It also provides a bearing assembly which is axially preloaded in a direction tending to oppose the general thrust support direction of the assembly.

Front-wheel-drive motor vehicles having solid front axles commonly utilize a pair of stub kingpins to pivotally mount each steerable wheel. The kingpins, mounted to a steering knuckle, are often separated from the axle housing by a pair of tapered roller bearings. Substitution of the vibration damped and preloaded bearing assembly described herein for the conventional tapered bearings results in substantially increased bearing life, reduction in vibrations in worn bearing assemblies, and improved vehicle riding and handling characteristics.

SUMMARY OF THE INVENTION

A vibration damped and preloaded antifriction bearing assembly constructed in accordance with this invention includes first and second bearing races separated by a plurality of rollable bearing elements. A first member engages an axial end of the first bearing race; a second member engages an axial end of the second bearing race and encloses the first member. An elastomeric member is compressed between the first and second members. Upon movement of one bearing race relative to the other, the first member rotates with the first bearing race, while the second member rotates with the second bearing race. Relative movement occurs between the elastomeric member and either the first or second member.

BRIEF DESCRIPTION OF THE DRAWINGS

FIG. 1 is a cross-sectional view of a portion of a steerable front axle of a front-wheel-drive vehicle.

FIG. 2 is a cross-sectional view of a kingpin and bearing assembly embodying the invention.

FIG. 3 is a cross-sectional view of an uninstalled elastomeric member.

DETAILED DESCRIPTION OF A PREFERRED EMBODIMENT

In FIG. 1 of the drawings a portion of a front axle housing is shown by a reference numeral 11. A steering knuckle 12 is pivotally connected to the axle housing by a pair of kingpin and bearing assemblies 13 and 14. A spindle 16 is secured to steering knuckle 12 by a series of capscrews 17. Also secured to knuckle 12 by the capscrews 17 is backing plate 18 of the vehicle front-wheel brakes. A portion of a brakedrum is illustrated by reference numeral 19. Received within spindle 16 and axle housing 11 are axle shafts 21 and 22, respectively, which are interconnected by universal joint 23. The pivotal axis of the steering knuckle 12, about the axle housing 11, passes through the center of universal joint 23. A caged roller bearing 24 supports axle shaft 21 within the spindle 16. Similarly, caged roller bearing 26 supports axle shaft 22 within housing 11.

A pair of coaxial bores 27 and 28 are formed in the arms of steering knuckle 12. Bores 27 and 28 receive identical kingpin units 29. The kingpin units 29 comprise flanged cap portions 31 and stepped diameter portions 32. The kingpin units 29 are coaxially secured to steering knuckle 12 by a number of capscrews 33. Tapered roller bearings 34 are press-fitted onto portions 32. Bearing 34 includes inner race 36, outer race 37 and rollers 38. Stepped diameter portions 32 are formed with convex ends 39, shown as hemispheres in FIG. 2. Hat-shaped, circular disc members 41 engage sides of inner races 36 and receive the convex ends 39 of portions 32 within their concave portions 42.

A pair of stepped bores 43 and 44 are formed in the yoke arms of axle housing 11 into which outer races 37 of bearings 34 are press-fitted Also received within stepped bores 43 and 44 and enclosing the ends 39 of kingpin units 29 are caps 46. Caps 46 engage and move with outer races 37 of bearings 34. Positioned between the discs 41 and the caps 46 are elastomeric dampers 47. The dampers as installed are compressed as illustrated in FIG. 2. FIG. 3 illustrates a damper 47, in an uninstalled, undeformed state. In the preferred embodiment of the invention, the damper has a thickness of approximately one-half inch, a maximum diameter of 1 inch, and is made of an urethane elastomer of a durometer hardness of 80—90 on the "A" scale. It is formed with a concave recess 48 on one side. The convex end 39 of kingpin unit 29, the concave portion 42 of hat-shaped disc 41 and the recess 48 of damper 47 cooperate to keep disc 41 and damper 47 in substantial axial alignment with kingpin unit 29. Oil seals 49 are press-fitted into stepped bores 43 and 44 and slidingly engage kingpin units 29.

A shim 51 may be positioned about kingpin unit 29 between the axle housing 11 and the steering knuckle 12. In the preferred embodiment of the invention, a shim of a thickness sufficient to produce a torsional drag of 9 to 16 foot-pounds between the housing and the knuckle is used.

OPERATION

The kingpin and bearing assemblies 13 and 14 provide a pivotal connection between the front axle housing 11 and the steering knuckle 12. The outer bearing race 37, cap 46, damper 47 and seal 49 remain fixed relative to the axle housing 11. The inner bearing race 36, disc 41 and kingpin unit 29 remain fixed relative to and turn with steering knuckle 12. Sliding movement thus occurs between the compressed elastomeric damper 47 and contoured disc 41. The friction between damper 47 and disc 41 creates a torque drag or a torsional preloading to the bearing assembly. The magnitude of the torque drag may be varied by changing the size or compression of the elastomeric damper.

The bearing assembly described above provides damping of both rotational and axial vibrations as well as significantly increased impact tolerance.

The foregoing description presents a presently preferred embodiment of the invention. Modifications and alterations will occur to those skilled in the art that are included within the scope and spirit of the following claims.

We claim:

1. A vibration damped and preloaded antifriction bearing assembly comprising:
   a first bearing race;
   a second bearing race;
   said races being separated by a plurality of bearing elements;
   said races each having a first axial end surface facing in one direction and a second axial end surface facing in the opposite direction;
   a first member engaging said first axial end surface of said first bearing race;
   a second member engaging said first axial end surface of said second bearing race; and
   a compressed elastomeric member received between said first member and said second member.

2. A bearing assembly according to claim 1 and including means to hold said races and said members in substantially fixed relative axial positions.

3. A bearing assembly according to claim 1 and including:
said first and second bearing races comprising inner and outer bearing races, respectively;
said bearing elements comprising tapered roller elements; and
said second member enclosing said first member and said elastomeric member.

4. A bearing assembly according to claim 1 and including:
said second member and the adjacent contacting surface of said elastomeric member being fixed in position relative to each other upon movement of one race relative to the other; and
said first member and the adjacent contacting surface of said elastomeric surface being slidable relative to each other upon movement of one race relative to the other.

5. A bearing assembly according to claim 1 and including the surface area of said first member in contact with said elastomeric member being less than the surface area of the second member in contact with said elastomeric member.

6. A bearing assembly according to claim 1 and including:
said elastomeric member having a generally circular shape; and
means to hold said members in substantially axial alignment with said bearing races.

7. A bearing assembly according to claim 1 and including:
said first and second bearing races comprising inner and outer bearing races, respectively, said bearing elements comprising tapered roller elements; and
said second member and the adjacent contacting surface of said elastomeric member being fixed in position relative to each other upon movement of one race relative to the other.

8. A bearing assembly according to claim 1 and including:
said elastomeric member having a generally circular shape;
means to hold said members in substantially axial alignment with said bearing races; and
means causing said elastomeric member to remain substantially fixed in said second member upon angular displacement of said second bearing race relative to said first bearing race.

9. A bearing assembly according to claim 8 and including:
said first and second bearing races comprising inner and outer bearing races, respectively; and
said bearing elements comprising tapered roller elements.

10. A combination kingpin and bearing assembly comprising:
a kingpin member having an unattached end, said end having a convex shape;
an inner bearing race secured to said kingpin member to move therewith;
an outer bearing race;
a plurality of tapered rollers separating said inner and outer bearing races;
a circular contoured disc member having a convex portion on one side and a concave portion on the other side, said concave portion receiving the convex end of said kingpin member;
said disc member engaging said inner race;
an elastomeric member having a concave indentation in one side that receives the convex portion of said disc member;
a cup member enclosing and compressing said elastomeric member between said cup member and said disc member and engaging said outer race;
means to hold said races and said members in fixed axial positions;
said outer race being movable about said inner race, said cup member fixed relative to said outer race and movable therewith, said disc member fixed relative to said inner race and movable therewith; and
said elastomeric member movable relative to said cup member upon angular displacement of said outer race relative to said inner race.

11. A pivotal connection for a steering knuckle and axle housing assembly of a motor vehicle comprising:
a pair of kingpin and bearing assemblies according to claim 10 coaxially received in and interconnecting said steering knuckle and said axle housing;
one of said pair of assemblies being inverted relative to the other;
each said kingpin member being secured to said steering knuckle and movable therewith; and
each said outer race being secured to said axle housing.

12. A pivotal connection for a steering knuckle and axle housing assembly of a motor vehicle including:
a pair of kingpin and bearing assemblies, each of said pair comprising a kingpin member having an unattached end;
a first bearing race secured to said kingpin member to move therewith;
a second bearing race, said races being separated by a plurality of bearing elements;
a first member engaging an axial end of said first bearing race;
a second member engaging an axial end of said second bearing race and enclosing said first member;
a compressed elastomeric member received between said first member and said second member; said pair of kingpin and bearing assemblies being coaxially received in and interconnecting said steering knuckle and said axle housing; and
one of said pair of assemblies being inverted relative to the other.

13. A pivotal connection for a steering knuckle and axle housing assembly of a motor vehicle including;
a pair of kingpin and bearing assemblies, each of said pair comprising a kingpin member having an unattached end;
a first bearing race secured to said kingpin member to move therewith;
a second bearing race, said races being separated by a plurality of bearing elements;
a first member engaging an axial end of said first bearing race;
a second member engaging an axial end of said second bearing race and enclosing said first member;
a compressed elastomeric member received between said first member and said second member, and said pair of kingpin and bearing assemblies being coaxially received in and interconnecting said steering knuckle and said axle housing.